3,544,374
FUEL CELL WITH D.C. POTENTIAL MEANS AND METHOD OF OPERATING SAME

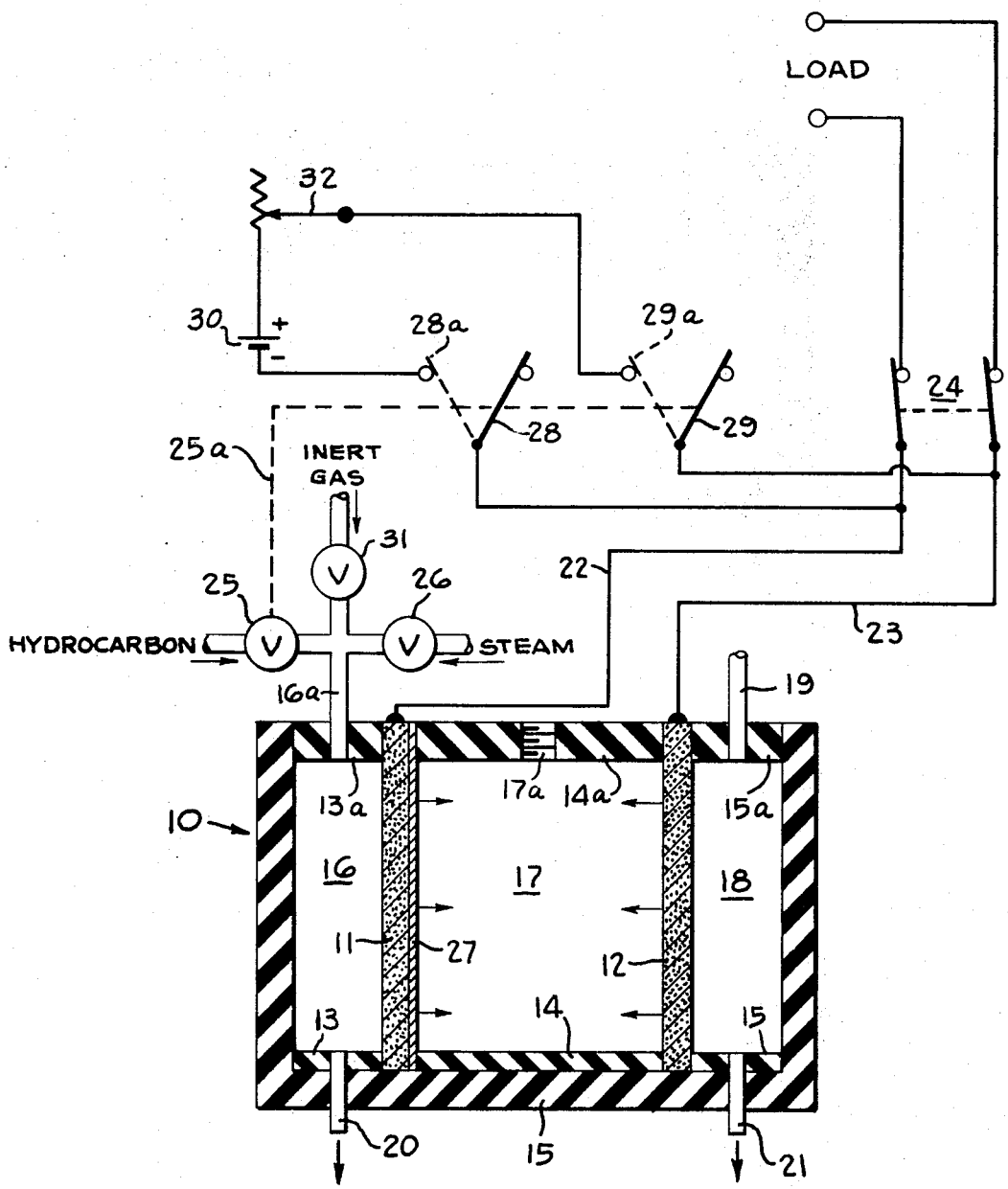

Alfred F. D'Alessandro, Havertown, and Harold Shalit, Drexel Hill, Pa., assignors to Atlantic Richfield Company, Philadelphia, Pa., a corporation of Pennsylvania
Filed May 25, 1966, Ser. No. 552,758
Int. Cl. H01m 27/06
U.S. Cl. 136—86                              8 Claims

ABSTRACT OF THE DISCLOSURE

This invention deals with fuel cells and in particular with a system for reducing the deterioration of anodes containing metallic hydrogen transfer membranes during periods of start-up and shut-down. During such operation hydrogen is removed from the vicinity of said membrane and a direct current potential is supplied to the membrane in a sufficient amount to maintain the membrane negative with respect to the cathode and chemically inactive with respect to the electrolyte.

---

This invention relates to fuel cells, and has for an object the provision of a method and an apparatus for preventing deterioration of hydrogen permeable metallic membranes used in fuel cell anodes during periods of start-up and shut-down of the cell, or whenever the supply of hydrogen fuel to the anode is discontinued.

Fuel cells adapted to employ hydrogen as a fuel are known and have been described in numerous publications in recent years. In such cells the hydrogen fuel is passed through the anode into a suitable electrolytic medium into which there is also passed, through the cathode, a suitable oxidant to cause a reaction resulting in the generation of electric current between the electrodes of the cell.

With respect to the hydrogen anode in such fuel cells it has been suggested to employ a metallic layer or membrane of, for example, nickel, palladium or a palladium alloy which is permeable to hydrogen, to facilitate transfer of hydrogen from the anode into the electrolyte. Because of its selective permeability to hydrogen, the membrane acts as a filter for the hydrogen, and the hydrogen transferred through the membrane and into the electrolyte is therefore of extremely high purity. In this regard, the ability of palladium and palladium alloy membranes to act as filters for hydrogen by virtue of their selective permeability to that gas is well known, as exemplified by Hunter, 2,773,561 (1956), assigned to the assignee of the present invention. Consequently, the hydrogen initially supplied to the cell may be relatively impure, since the membrane permits only pure hydrogen to be passed into the electrolytic medium. Furthermore, use of the membrane permits in situ production of hydrogen by conducting in the cell a steam reforming reaction to produce hydrogen which is then passed through the membrane and into the electrolyte.

In fuel cells incorporating a hydrogen permeable metallic membrane in the anode, electrolytes are often employed which would attack the membrane were it not for the presence of hydrogen which, during cell operation, serves to protect the membrane from the corrosive effects of the electrolyte. For example, sodium hydroxide and potassium hydroxide in molten form will attack a hydrogen permeable membrane of nickel, palladium or a palladium alloy during cell shut-down, i.e., when the supply of hydrogen to the anode is terminated. Prior art attempts to avoid this corrosion involve supplying continuously during cell shut-down an amount of hydrogen to the anode to protect the membrane surface exposed to the electrolyte. While such procedure has afforded protection against the corrosive effects of the electrolyte, there is an additional deterioration to which palladium membranes are subject during cell start-up and shut-down. Specifically, at the operating temperature of the fuel cell, i.e., temperatures of the order of 500° C., palladium in the presence of hydrogen at one atmosphere exists in the form of a hydride referred to as alpha phase palladium. When the cell is shut down, the cessation of the electrochemical reaction results in a drop of the cell temperature from operating temperature to the surrounding room temperature. As the cell temperature, and consequently the temperature of the palladium membrane, drops below about 100° C., the palladium undergoes a phase change and is transformed to beta phase palladium. This transition between the alpha and the beta phases, if rapid or if occurring repeatedly, causes the palladium to become fragile and eventually results in complete disintegration of the membrane. Therefore, protecting the membrane from the electrolyte by supplying the membrane with hydrogen during cell shut-down serves to facilitate phase transition of the palladium between the alpha and beta phases as the temperature of the membrane rises above and falls below the phase transition temperature. After a few phase transitions (two transitions each time the cell is shut down and started up again), the membrane becomes so embrittled it virtually falls apart.

It is, therefore, a primary object of this invention to provide a means for preventing corrosion of hydrogen permeable membranes employed in fuel cell anodes, which corrosion occurs during periods when no hydrogen is supplied to the anode.

Another object of the invention is to provide a method for preventing anode deterioration from occurring when no hydrogen is supplied to the anode, or during cell cooling and warm-up.

A further object of the invention is to provide an apparatus which facilitates the prevention of such corrosion or deterioration when no hydrogen is supplied to the anode, or during cell cooling and warm-up.

In carrying out the above objects, the present invention in one form utilizes means for maintaining the hydrogen permeable membrane included in the anode of a fuel cell chemically inactive with respect to the corrosive electrolyte to which the membrane is exposed in the absence of hydrogen in the vicinity of the membrane. Briefly stated, this can be achieved in accordance with the invention by the method which comprises applying a direct current potential between the cathode and the anode of the fuel cell to maintain the metallic hydrogen permeable membrane negative, i.e. reducing, with respect to the cathode.

In accordance with a further embodiment of the present invention, a palladium or palladium alloy membrane included within the anode of a fuel cell can be protected against deterioration occurring as a result of repeated phase transitions between the alpha and beta phases as well as the corrosion resulting from the exposure of the membrane to the electrolyte. This can be achieved in accordance with the invention by removing hydrogen from the vicinity of the membrane during cell start-up or shut-down and maintaining the membrane in a hydrogen free environment during the period that the temperature of the membranes passes through the temperature at which phase transition occurs.

Generally speaking, the removal of hydrogen from the vicinity of the membrane can be achieved by flushing the anode including the membrane with a gas which is inert, i.e., nonreactive with respect to the membrane. Examples of suitable inert gases are nitrogen, carbon dioxide, flue gas, argon, and steam. Other suitable gases will readily occur to those skilled in the art. In the event the fuel cell is of the in situ type in which a hydrocarbon and steam are fed to a reforming zone in the cell to produce hydrogen internally, the membrane can be flushed free of hydrogen by simply terminating the hydrocarbon supply to the reforming zone while maintaining the flow of steam to the zone. The steam can then purge all of the hydrogen from the vicinity of the membrane which in such a cell will be located adjacent the reforming zone.

In accordance with the invention, the direct current potential applied between the anode and the cathode of the fuel cell is impressed as soon as the supply of hydrogen to the membrane is terminated. In cells in which hydrogen is generated internally, such as in situ cells involving steam reforming of a hydrocarbon fuel to produce hydrogen, the direct current potential can be applied between the electrodes when the flow of hydrocarbon to the reforming zone is stopped. Where hydrogen fuel is fed directly to the cell, the potential can be applied as soon as the supply of hydrogen to the cell is terminated.

The magnitude of the direct current potential applied between the electrodes of the fuel cell can vary within wide limits. We have found that where the membrane is formed of palladium or a hydrogen permeable palladium alloy the potential should be such that the membrane is maintained at least about 0.5 volt more negative than the cathode. Where the membrane is of nickel, the potential should be such that the membrane is maintained at least about 0.8 volt more negative than the cathode. The upper limit of the potential is governed solely by practical rather than theoretical considerations. For example, the practical upper limit of the potential applied between the electrodes disposed in an alkali metal hydroxide electrolyte will be that value at which alkali metal begins to deposit from the electrolyte a value less than that at which electrolysis would occur. For sodium hydroxide, this value will be about 3 volts. Though higher potentials may be used they are neither practical nor necessary.

For a better understanding of the invention and a more detailed description of other useful features, reference is to be had to the following description taken in conjunction with the accompanying drawing, the single figure of which is a cross-sectional view of a fuel cell assembly illustrating an embodiment of the present invention.

Referring more particularly to the drawing, the fuel cell assembly includes a fuel cell having an outer casing 10 of a nonconductive impermeable material and a pair of electrodes, an anode 11, and a cathode 12, which are maintained in the casing by spacers 13, 14, and 15 to provide a reforming zone 16 containing a reforming catalyst (not shown), an electrolyte space 17, and an oxidant space 18, respectively. The upper spacers 13a and 15a are provided with suitable conduits 16a and 19 to supply fuel and oxidant respectively, to the reforming zone 16, and to the oxidant space 18. Outlet pipes 20 and 21 are provided for venting of the gases. Leads 22 and 23 connected to the electrodes 11 and 12 respectively, supply electric current to the load being operated by the cell when the double pole switch 24 is in the closed position, as shown.

During cell operation, the electrolyte space 17 is filled with a suitable electrolyte, such as molten sodium hydroxide, and a fuel gas comprising a mixture of a hydrocarbon and steam is fed to the reforming zone 16 through conduit 16a. The amounts of hydrocarbon and steam supplied to zone 16 can be controlled by adjustment of the flow control valves 25 and 26 respectively. In the zone 16, the steam reacts with the hydrocarbon producing hydrogen gas. The anode 11 comprises a microporous substrate such, for example, as microporous carbon, having on its face exposed to the electrolyte a nonporous hydrogen permeable metallic membrane 27 of nickel, palladium or a hydrogen permeable palladium alloy. Although the thickness of the membrane 27 can vary to a large extent, thin membranes having thicknesses of the order of 0.0001 inch or less are preferred. By virtue of the selective permeability to hydrogen of the membrane 27 only the hydrogen generated by the reforming reaction passes into the electrolyte zone 17. All other products of the steam reforming reaction as well as excess or unreacted starting components are vented out of the cell via outlet pipe 20. The water formed in the electrolyte as a result of the electrochemical oxidation of hydrogen vaporizes out of the electrolyte through opening 17a in the upper spacer 14a.

When double pole switch 24 is opened, the supply of current generated in the cell to the load is discontinued. The supply of hydrocarbon gas to the reforming zone 16 can then be terminated by closing valve 25. As shown, valve 25 is coupled through suitable coupling means, represented by the dotted line 25a, to switches 28 and 29 respectively, such that the closing of the valve 25 closes switches 28 and 29. The coupling means 25a can be a direct mechanical coupling or an indirect electromechanical coupling of any type well known to those skilled in the art. When closed, the switches thus assume the positions represented by dotted lines 28a and 29a respectively, and close the circuit including a suitable D.C. source, exemplified by the battery 30, to apply a direct current potential across the electrodes 11 and 12 of a magnitude sufficient to maintain the membrane 27 negative with respect to the cathode 12.

In the embodiment shown, the steam control valve 26 is left in the open position while the hydrocarbon control valve 25 is closed. This permits the steam to flush the reforming zone 16 free of all hydrogen that may be present in the vicinity of the membrane 27. Alternatively, valve 26 can be closed, and valve 31 can be opened to introduce an inert gas such as nitrogen from a suitable source (not shown) into the reforming zone 16 to remove all traces of hydrogen from the vicinity of the membrane 27.

As noted above, the magnitude of the direct current potential applied between the electrodes 11 and 12 can be varied to a large extent. To this end a suitable voltage regulating means, as exemplified by variable resistor 32, is placed in the circuit of the direct current source 30 in order to vary the magnitude of the voltage supplied between the electrodes 11 and 12. As previously stated, the potential should be of a magnitude sufficient to maintain the membrane 27 chemically inactive with respect to the electrolyte contained in the chamber 17, i.e., at least about 0.5 volt more negative than the cathode when the membrane is formed of palladium or a hydrogen permeable palladium alloy, and at least about 0.8 volt more negative than the cathode when the membrane is formed of nickel.

From the foregoing it will be appreciated that when the supply of hydrocarbon to the reforming zone is terminated by closing valve 25 (thereby terminating the supply of hydrogen to the membrane 27), switches 28 and 29 will close and a potential will be supplied between the electrodes 11 and 12 from the direct current source 30, and will be maintained during the period when no hydrogen is supplied to the membrane. The magnitude of the potential will be sufficient to render the hydrogen permeable metallic membrane 27 chemically inert with respect to the electrolyte contained in the chamber 17. Concurrently with the application of the direct current potential between the electrodes, the hydrogen present in the vicinity of the membrane is removed by flushing the reforming zone 16 with steam or any suitable gas inert with respect to the membrane 27. Thus, the membrane is maintained free from contact with hydrogen when the temperature of the cell, and consequently the membrane, falls from the operating temperature of about 500° C. to the surrounding room temperature.

When it is desired to start the cell, the electrolyte in the cell is heated to the operating temperature thus bringing the temperature of the membrane to the value well above the phase transition temperature. Hydrocarbon and steam are then introduced to the zone 16 for commencement of the reforming reaction to produce the hydrogen fuel. The hydrogen so produced immediately passes through the membrane 27 and thus afford protection against the corrosive effects of the electrolyte. When this occurs, the external potential applied between the electrodes 11 and 12 to maintain the membrane negative with respect to the cathode may be removed.

It has been found that fuel cells incorporating palladium membranes in their anodes for transfer of hydrogen through the anode and into the electrolyte comprising a molten hydroxide of sodium or potassium will degenerate completely after three or four shut-down periods during which the temperature of the membrane is permitted to pass through the phase transition temperature. This deterioration was found to occur despite the fact that a small amount of hydrogen was constantly supplied to the palladium membrane to protect it from the effects of the caustic electrolyte contained in the electrolyte chamber. In accordance with the present invention, however, fuel cells incorporating palladium or hydrogen permeable palladium allow membranes in their anodes can be shut down any number of times without any visible effect or deterioration of the palladium membrane.

The present invention thus affords a new and reliable solution to the problem of hydrogen transfer membrane corrosion which occurs in fuel cells during periods when no hydrogen is supplied to the membrane. As will be appreciated by those skilled in the art, the invention finds particular utility in the prevention of deterioration of hydrogen permeable metallic membranes which are attacked by corrosive fuel cell electrolytes such as, for example, molten salt electrolytes, including molten alkali metal hydroxides and carbonates, and specifically of those membranes exhibiting the tendency to deteriorate as the result of undergoing repeated phase transitions because of temperature variations in the presence of hydrogen.

It should be understood that the present invention is not to be considered limited to any of the specific embodiments herein described but may be used in other ways without departure from the spirit of the invention or the scope of the appended claims.

What is claimed is:

1. The combination of a fuel cell including an electrolyte, an anode and a cathode disposed in contact with said electrolyte, a reforming zone adjacent said anode adapted for the production of hydrogen from a hydrocarbon and steam, said anode including a hydrogen permeabile metallic membrane for transfer of hydrogen generated in said zone into said electrolyte, means for controlling the supply of hydrocarbon and steam to said reforming zone, and means for applying a direct current potential between said anode and said cathode to maintain said membrane chemically inactive with respect to said electrolyte in the absence of hydrogen in the vicinity of said membrane, said means for applying the direct current potential being responsive to the flow of hydrocarbon to said zone such that the direct current potential between said anode and said cathode is applied when the supply of hydrocarbon to said zone is terminated.

2. The combination of claim 1 including means for supplying to the vicinity of said membrane a gas inert with respect to said membrane to remove hydrogen from said vicinity.

3. The combination of claim 1 wherein the membrane contains palladium and the electrolyte is a molten alkali metal hydroxide.

4. In a method for operating a fuel cell having an anode and a cathode disposed in contact with an electrolyte and wherein said anode includes a hydrogen permeable metallic membrane through which hydrogen is passed into the electrolyte for electrochemical reaction in the cell and said cell is adapted to have operating and non-operating periods, said electrolyte being normally corrosive to said membrane; the method of preventing deterioration of said membrane during said periods of non-operation when the supply of hydrogen to said electrolyte through said membrane is terminated, which comprises the steps of: removal of hydrogen from the vicinity of said membrane thereby maintaining said membrane in a hydrogen free environment and concurrently applying a direct current potential between said anode and a second electrode to render said membrane more negative than said cathode and below its corrosion potential; said direct current potential having such magnitude that the membrane is maintained at least about 0.5 volt more negative than said cathode but less than that magnitude which would cause electrolysis of the electrolyte.

5. The method of claim 4 in which hydrogen is removed from the vicinity of the membrane by flushing said membrane with a gas which is nonreactive in respect to said membrane.

6. The method of claim 4 wherein the hydrogen permeabile membrane contains palladium.

7. A method of claim 4 wherein the electrolyte is a molten alkali metal hydroxide.

8. The method of claim 4 wherein the hydrogen is produced in situ in a reforming zone adjacent said anode from a hydrocarbon and steam.

References Cited

UNITED STATES PATENTS

| | | | |
|---|---|---|---|
| 3,121,031 | 2/1964 | Gruneberg et al. | 136—86 |
| 3,134,697 | 5/1964 | Niediach | 136—86 |
| 3,220,937 | 11/1965 | Friese et al. | 136—86 X |
| 3,259,523 | 7/1966 | Faris et al. | 136—86 |
| 3,337,369 | 8/1967 | Frazier | 136—86 |
| 3,080,304 | 3/1963 | Andrus | 204—129 |
| 3,407,094 | 10/1968 | Juda | 136—86 |
| 3,407,095 | 10/1968 | Juda et al. | 136—86 |
| 3,446,674 | 5/1969 | Giner | 136—86 |

FOREIGN PATENTS

| | | |
|---|---|---|
| 973,810 | 10/1964 | Great Britain. |
| 1,383,637 | 11/1964 | France. |

OTHER REFERENCES

Fuel Cell Systems, H-O Fuel Cell, by L. M. Litz, p. 173, TK2920 A5, 1963/1964, American Chemical Society.

ALLEN B. CURTIS, Primary Examiner

U.S. Cl. X.R.

204—129